Figure 1:
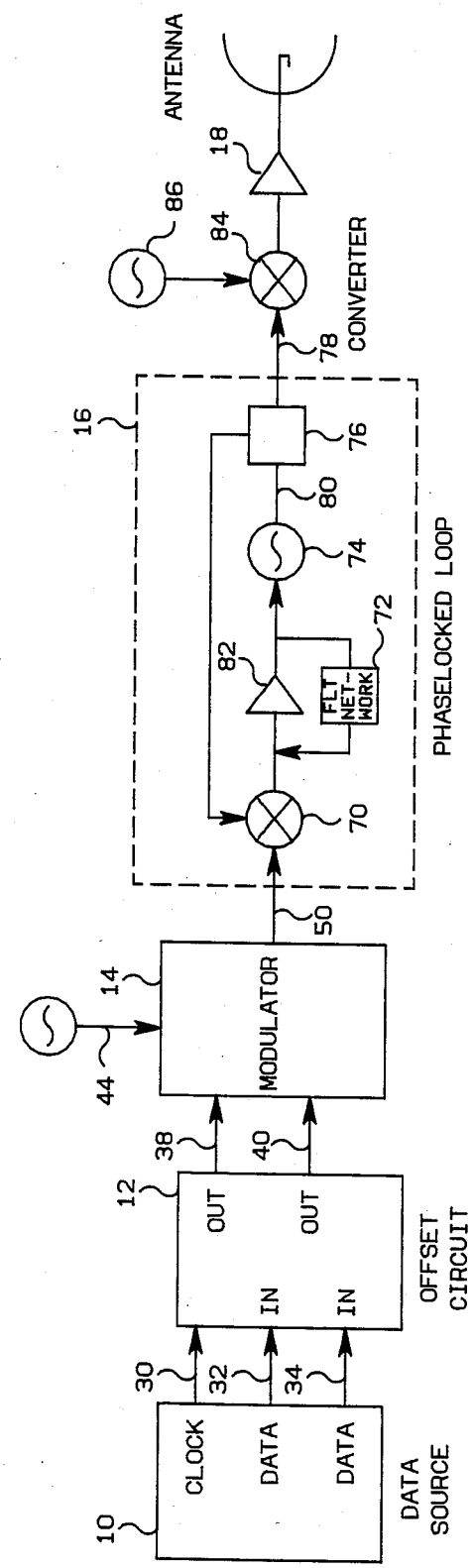

United States Patent [19]

Norton et al.

[11] Patent Number: 4,737,968
[45] Date of Patent: Apr. 12, 1988

[54] QPSK TRANSMISSION SYSTEM HAVING PHASELOCKED TRACKING FILTER FOR SPECTRUM SHAPING

[75] Inventors: Jerry J. Norton, Caney, Kans.; Martin H. Beauford, Bartlesville, Okla.

[73] Assignee: Phillips Petroleum Company, Bartlesville, Okla.

[21] Appl. No.: 791,622

[22] Filed: Oct. 25, 1985

[51] Int. Cl.[4] .............................................. H03C 3/02
[52] U.S. Cl. ........................................ 375/60; 331/17; 332/16 R; 375/67
[58] Field of Search .................... 375/52, 53, 54, 67, 375/120, 60; 332/9 R, 10, 16 R, 21; 307/590, 601, 606; 329/124; 331/1 A, 17; 328/128; 330/294; 364/840

[56] References Cited

U.S. PATENT DOCUMENTS

| | | | |
|---|---|---|---|
| 3,100,890 | 8/1963 | Henning | 375/53 |
| 3,128,342 | 4/1964 | Baker et al. | 375/67 |
| 3,484,594 | 12/1969 | Gilbert et al. | 364/840 |
| 3,959,601 | 5/1976 | Olevsky et al. | 375/120 |
| 4,021,743 | 5/1977 | Claxton | 329/124 |
| 4,267,591 | 5/1981 | Wissel et al. | 375/54 |
| 4,320,499 | 3/1982 | Muilwijk et al. | 375/17 |
| 4,352,074 | 9/1982 | Blinchikoff et al. | 331/17 |
| 4,453,257 | 6/1984 | Lo et al. | 375/60 |
| 4,491,805 | 1/1985 | Laures et al. | 331/18 |
| 4,528,526 | 7/1985 | McBiles | 375/54 |
| 4,594,555 | 6/1986 | Hilton | 329/124 |

*Primary Examiner*—Benedict V. Safourek
*Attorney, Agent, or Firm*—G. E. Bogatie

[57] ABSTRACT

A system for transmitting digital data employs an angle modulated carrier signal having constant amplitude and a limited spectrum. The system comprises an offset quadrature phase shift key (QPSK) modulator with a "tracking filter" phaselocked loop at the output of the QPSK modulator. The phaselocked loop has a voltage controlled oscillator which produces a constant amplitude carrier signal at the output of the loop, and also has a low pass loop filter which reduces the spectrum of the phase modulated carrier signal. Additional spectrum shaping is obtained by connecting L-R-C circuits to the low pass loop filter to eliminate predetermined frequency components from the output of the loop.

10 Claims, 9 Drawing Sheets

QPSK TRANSMISSION SYSTEM HAVING PHASELOCKED TRACKING FILTER FOR SPECTRUM SHAPING

This invention generally relates to digital data communication. In one aspect it relates to a phase modulator for use in a radio frequency communication system. In yet another aspect it relates to a method for controlling spurious emissions generated in phase modulating a continuous radio frequency carrier wave.

Digital information is frequently transmitted from point to point by systems which modulate the phase or frequency of a carrier signal in response to modulating signals which are binary bit streams representative of the characters to be transmitted. This type of modulation is used for both signals transmitted over wires and for radio signals transmitted via electromagnetic radiation.

Four-state quadrature phase shift key (QPSK) modulation systems are conventionally used for transmitting digital information. Formation of a QPSK phase modulated signal for radio communication typically involves translating a digitally modulated intermediate frequency signal through a succession of up converters which are separated by amplifiers and spectrum shaping filters, followed by a high power amplifier and an RF bandpass filter, the signal then being transmitted typically at 216 to 220 MHz for non-government telemetry systems in the United States.

Control of spectrum for radio transmission of digital data is difficult to realize because modulation techniques for digital signals usually result in a modulated carrier signal having amplitude variations. The problem is further compounded since spectral shaping techniques can also cause undesired amplitude modulation on the carrier signal. Following modulation and spectrum shaping a carrier signal with amplitude modulation must pass through only linear components to the antenna. If non-linear components are encountered by a carrier signal having amplitude modulation, additional sidebands are generated, causing additional interference between adjacent channels.

In particular the high power amplifier, typically a class C amplifier, is non-linear as its power handling capacity is increasingly utilized. Signals with amplitude modulation passing through the high power amplifier must be kept to a considerably lower level than the amplifier would other wise be able to handle if additional interference is to be avoided.

While QPSK has been recognized as an efficient format for transmitting digital data in terms of data rate, error rate and transmitted power level, it lacks efficiency from the standpoint of occupied bandwidth, where occupied bandwidth is defined as the bandwidth which contains 99 percent of all the transmitted power. A digital data transmission system which can achieve QPSK modulation while controlling the bandwidth occupied by the transmitted power, and which can efficiently utilize non-linear components following spectrum shaping of a modulated signal would prove to be a useful device.

SUMMARY OF THE INVENTION

Accordingly, it is an object of the present invention to provide a data communication system which takes maximum advantage of the available bandwidth. It is a further object of the present invention to provide a digital data communication system which combines the advantages of QPSK modulation and phaselocked tracking filters. It is a still further object of the present invention to control the spectrum of the transmitted power in a QPSK modulated signal.

In accordance with the present invention two serial digital data streams to be transmitted, which are in the form of non-return-to zero (NRZ) signals synchronized to a common clock signal, are applied to an offset circuit. The offset circuit displaces one digital data stream with respect to the other digital data stream by $\frac{1}{2}$ of the period of the clock signal. Both digital data streams are applied to a quadriphase modulator along with a carrier signal. The two digital signals modulate the carrier and accordingly, there is generated an offset QPSK modulated carrier signal which contains 4-state phase modulation.

The spectrum of the QPSK modulated signal is shaped by a tracking filter type phaselocked-loop at the output of the modulator.

It has been found that spectrum shaping is facilitated by modifying conventional filter element in the phaselocked loop to include L-C circuits tuned to predetermined frequencies. This eliminates these predetermined frequencies and creates notches centered about these frequencies at the output of the phaselocked loop. Correspondingly, sideband suppression at the notch frequency in the spectrum of transmitted power is achieved. Rather surprisingly, it was discovered that several notches which are essentially independent can be incorporated in a low pass filter. Accordingly, the spectrum can be extensively modified to comply with regulatory requirements of various agencies, or as desired for other purposes. In addition a constant amplitude modulated signal is obtained from the output of the phase locked loop.

In general, the invention is a ditigal phase modulator for a transmitter comprising an offset QPSK modulator, and a phaselocked loop at the output of the QPSK modulator having means for shape compensating the spectrum of the final output-signal. As a result of the constant amplitude feature of the modulated signal, it can be amplified by a high power amplifier operating at near its maximum power handling capacity, and up-conversion can be performed in non-linear circuits. As a result of the spectrum shaping filter, the final output signal can be made to conform to particular requirements for occupied bandwidth.

Other objects and advantages of the invention will be apparent from the foregoing brief description of the invention and the claims as well as the detailed description of the drawing in which FIG. 1 is a general block diagram of a digital communication transmission system according to the present invention.

Figure 2:
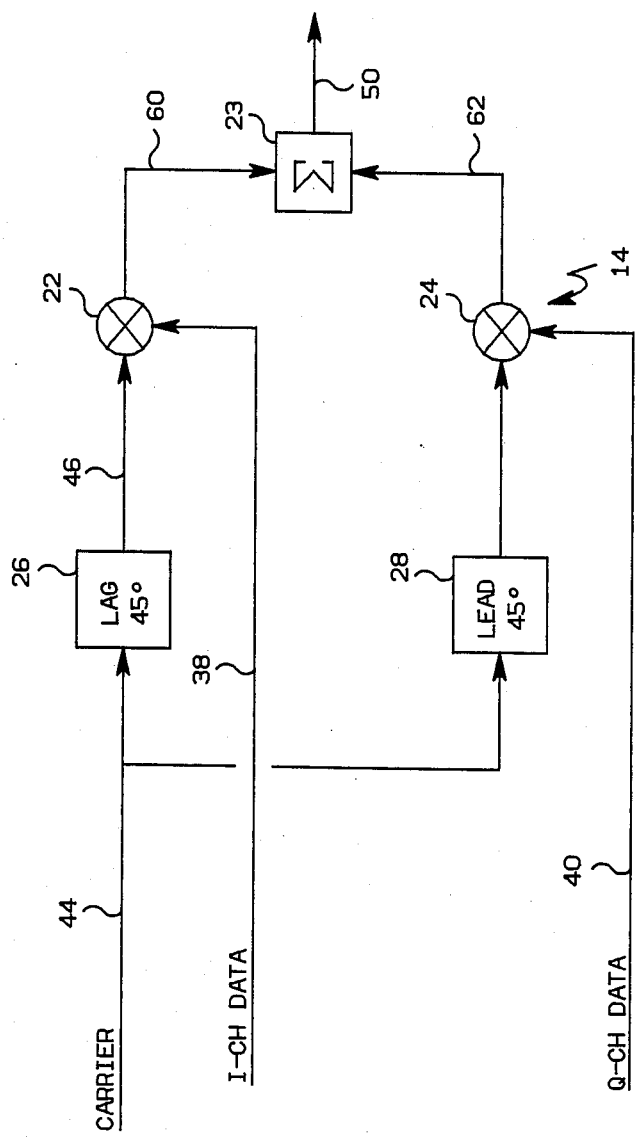

FIG. 2 is a functional schematic of a QPSK modulator.

Figure 3:
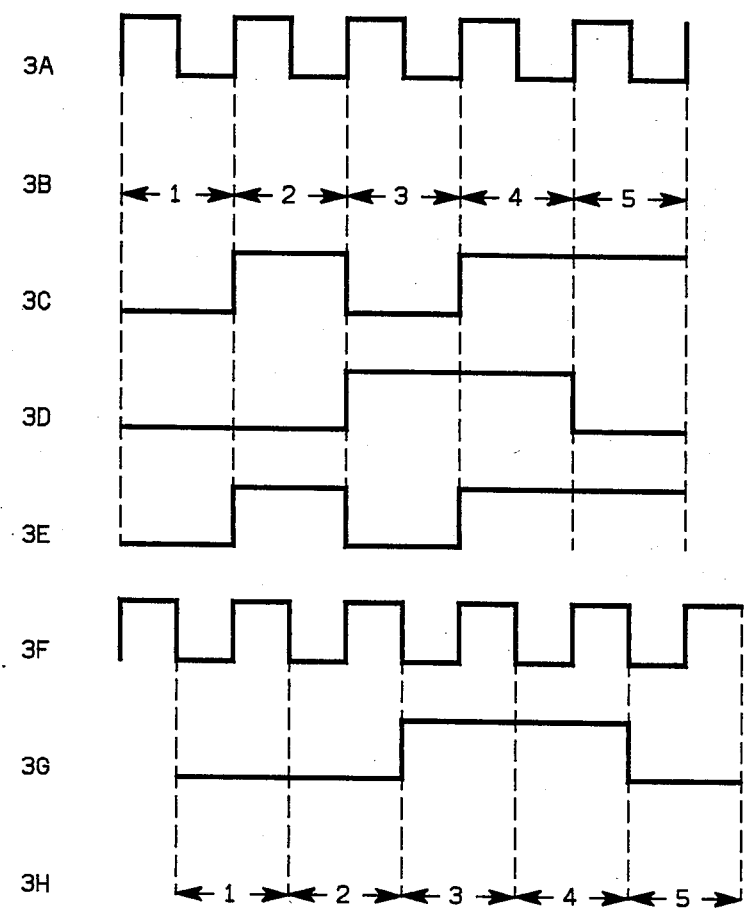

FIG. 3 A-H are a series of waveforms illustrating offset QPSK technique.

Figure 4:
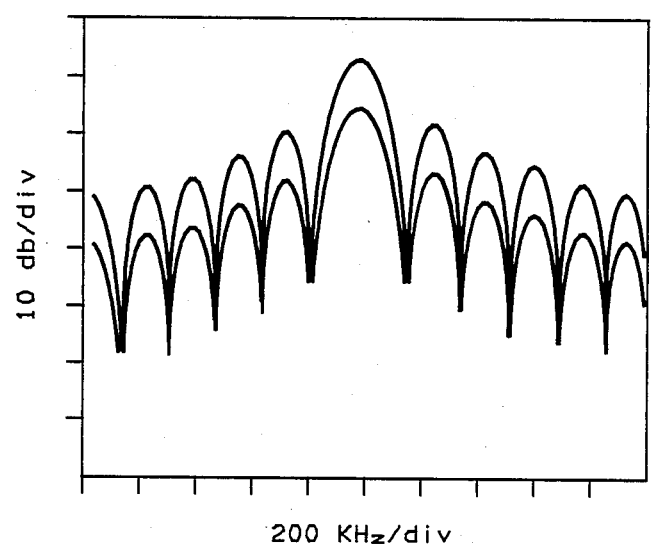

FIG. 4 is the spectrum of an unfiltered QSPK modulated signal.

FIG. 5 A-D are a series of filter circuits for spectral shaping.

FIG. 6 A-D are a series of spectral shapes corresponding to the filter circuits in FIG. 5.

Figure 7A:
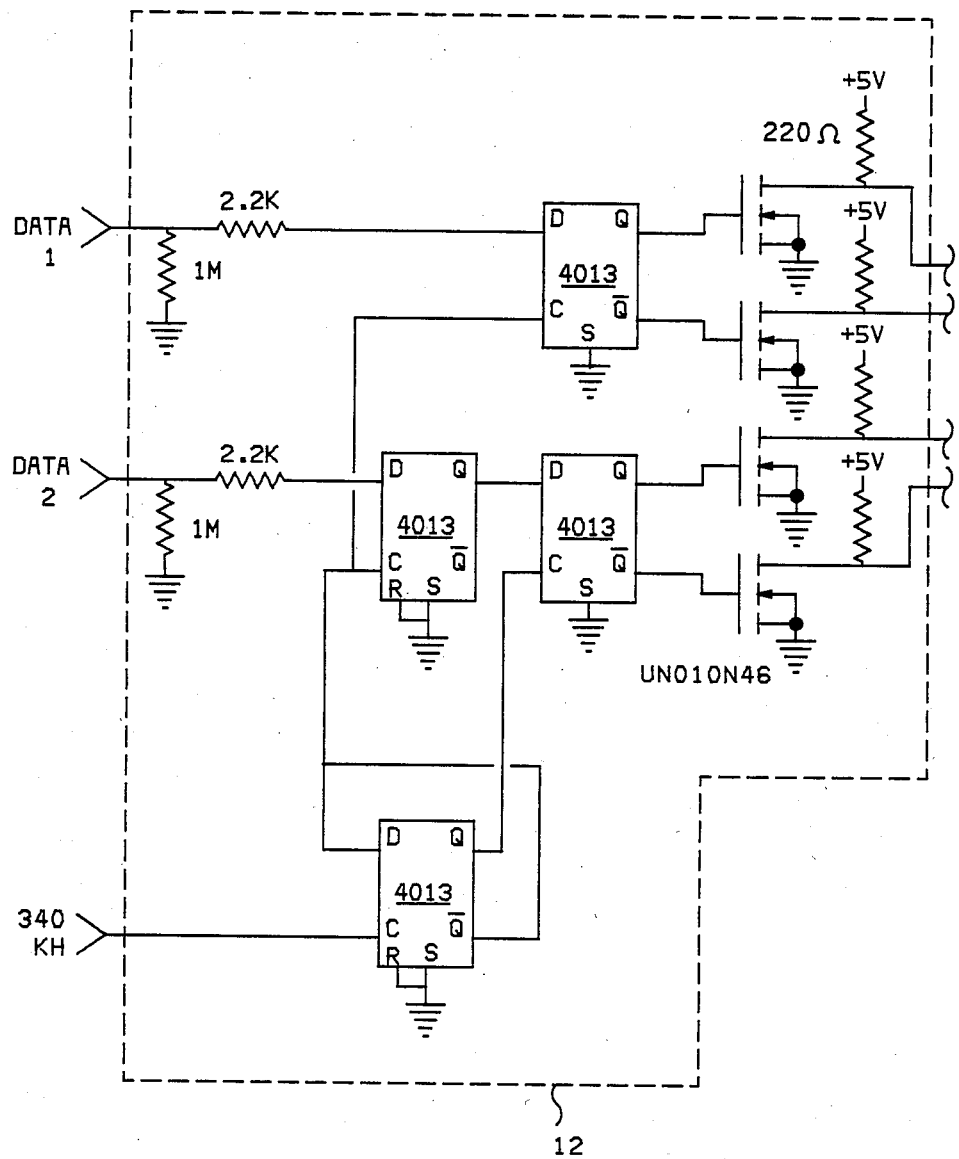
Figure 7B:
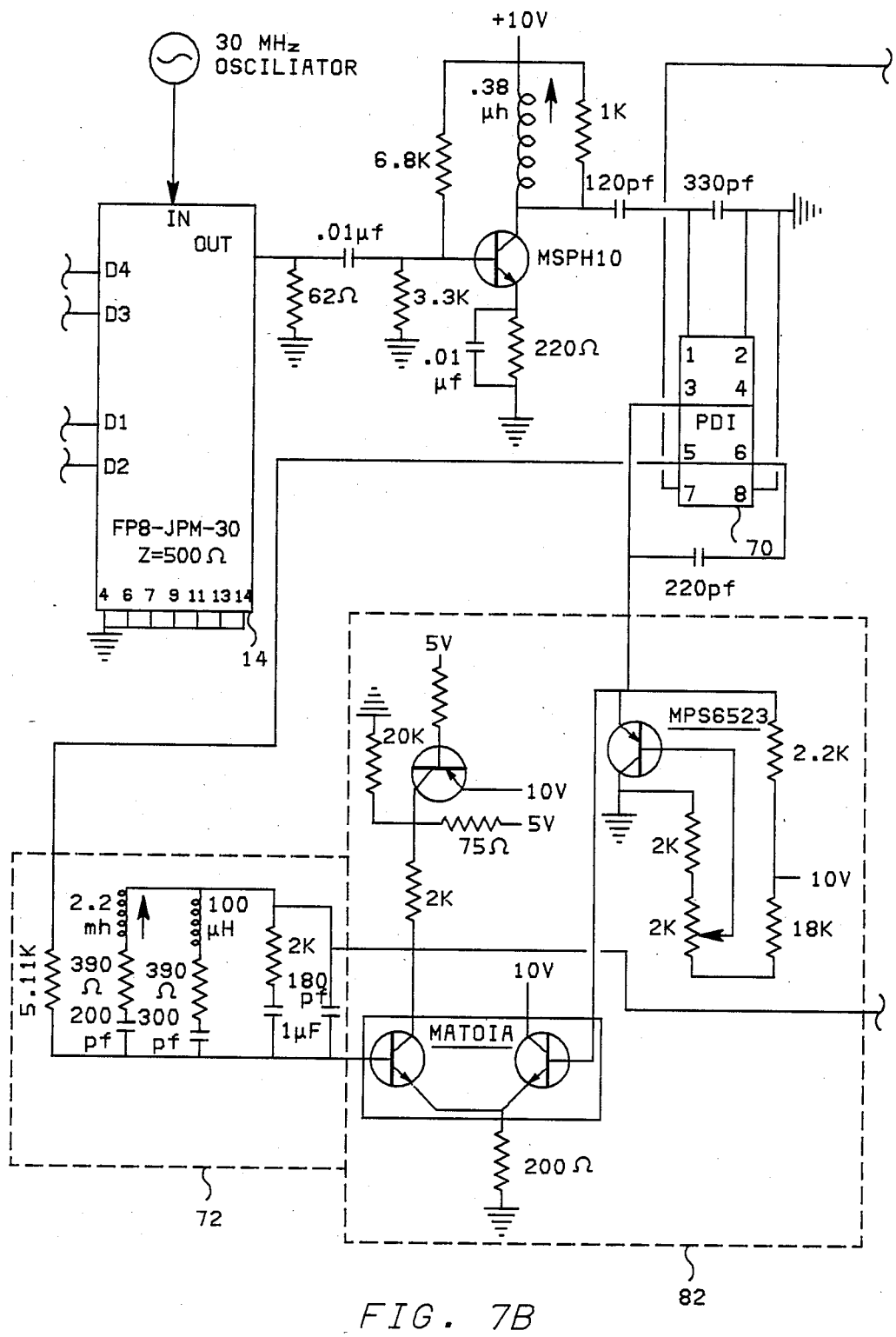
Figure 7C:
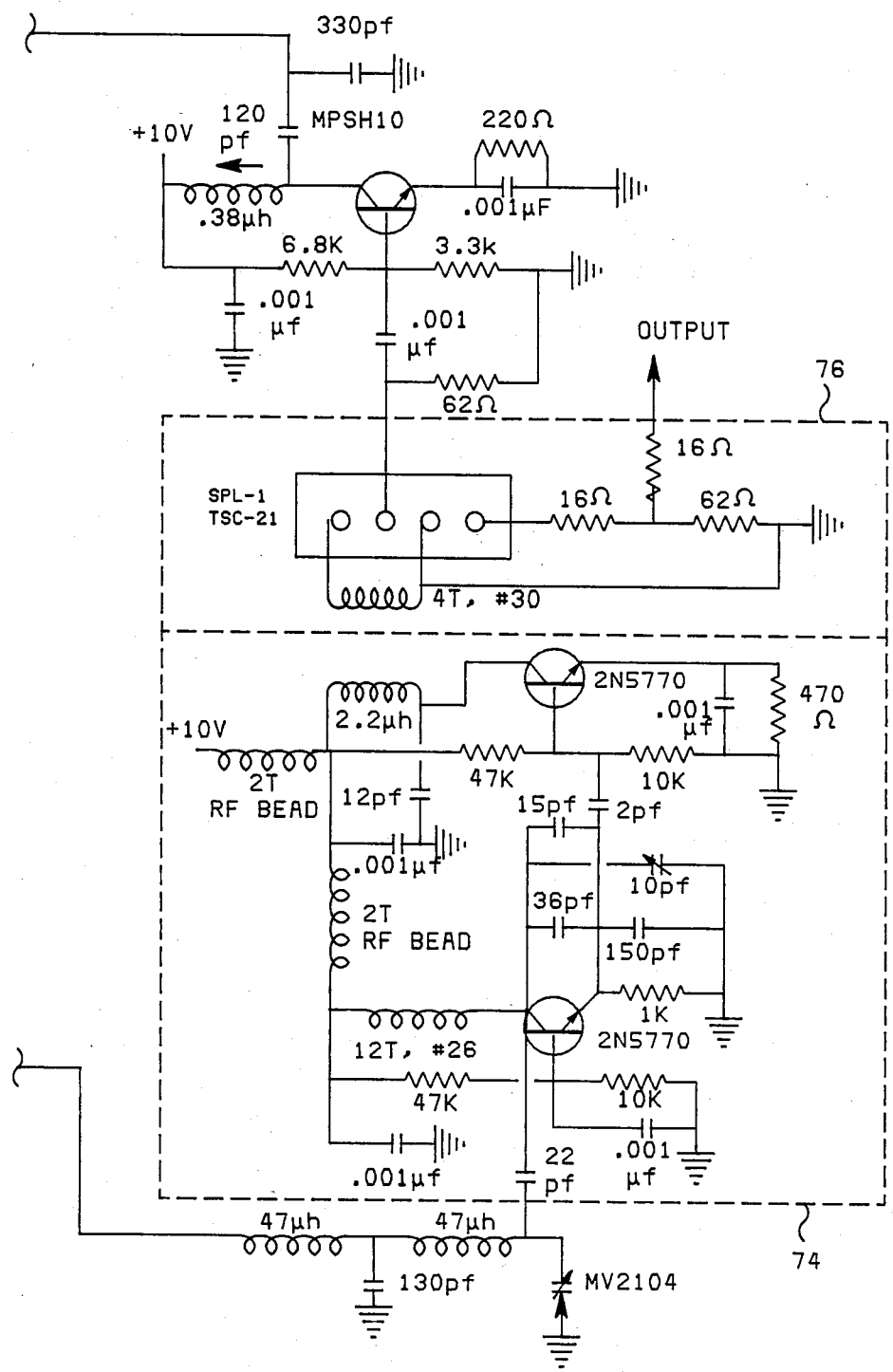

FIG. 7 A-C in combination are a schematic diagram of electronic circuitry which may be utilized to generate a constant amplitude QPSK signal according to the present invention. DETAILED DESCRIPTION The invention is described in terms of particular circuitry for modulating a carrier wave in response to two digital data streams which are in a NRZ format, and is also described in terms of particular circuitry for shaping the spectrum of the output signal of a phase modulated system. The invention is, however, applicable to different systems which accomplish the functions required by the present invention.

Referring now to the drawings and in particular to FIG. 1, a data source 10, which can be a data acquisition system, is interfaced with an offset circuit 12. The data source 10 provides a first NRZ digital data stream 32 to be transmitted, a second NRZ digital data stream 34 to be transmitted and an associated clock signal 30 to the offset circuit 12. The second NRZ data stream 34 is offset with respect to the first NRZ digital data stream 32 by ½ of the period of the clock signal 30 by the offset circuit 12.

Referring now to FIGS. 3A-H there is illustrated with approximate waveforms the operation of the offset circuit 12. FIG. 3A shows the clock signal 30 that is applied to the clock input of offset circuit 12. FIG. 3B shows the location of bit cells for transitions of the digital data streams 32, 34 and 38 which are synchronized to the rising edge of the clock 30. FIGS. 3C and D show data streams 32 and 34 as applied to the data inputs of offset circuit 12. FIG. 3E shows the digital data output signal 38 whichis identical to data input signal 32. FIG. 3F repeats the clock signal shown in FIG. 3A for comparison with FIG. 3G. FIG. 3G shows the output data stream 40, and FIG. 3H shows the location of the bit cells for offset data stream 40 where data transitions occur on the falling edge of clock 30.

A QPSK modulator is utilized as modulator 14 which is particularly useful in a modulation scheme wherein offset data streams are provided as inputs to the QPSK modulator. Referring now to FIG. 2 which illustrates functionally a QPSK modulator, the operation of the QPSK modulator will first be explained in terms of conventional (non-offset) operation. In QPSK the transmitted phase can be any one of 4 phases i.e., 0°, 90°, 180° or 270° and each quaternary phase state represents one of four possible combinations of 2 binary bits namely 00, 01, 10, 11. One bit is provided from each of the two digital data streams 32 and 34 to form 4-state data for transmission. As shown in FIG. 2, the digital data stream 38, which is typically called the I channel data stream, is provided as a first input to a first double balanced mixer 22. Signal 44 which is the intermediate frequency (IF) carrier signal is provided as an input to the lag network block 26 and is also provided to the lead network block 28. Signal 46 which is the IF carrier signal 44 lagged by 45°, is provided from the output of lag network block 26 as a second input to the double balanced mixer 22. In response to signals 38 and 46, the double balanced mixer 22 provides an output signal 60. Signal 60 is the carrier signal 44 lagged by 45° if the I-channel data is 0, or is the carrier signal 44 leading by 135° if the I-channel data is 1. Therefore, the mixer output signal 60 is a vector quantity which has an angle of either −45° or 135°.

In a similar manner digital data stream 40, typically called the Q-Channel, the lead network block 28, and the double balanced mixer 24 produce an output signal 62 from double balanced mixer 24 that is a vector quantity which has an angle of either +45° or 225°. Signal 62 and 64 are provided as inputs to summing-block 23 which provides modulator output signal 50.

It is noted that if the I-channel and the Q-channel data bits change simultaneously e.g., I-channel changes from 0 to 1, and the Q-channel changes from 0 to 1 on the same edge of the clock pulse the modulator output signal 50 will change from 0° to 180°. When neither bit changes there is no phase shift and if only one bit changes, modulator output signal 50 changes by ±90°. If the I-channel data stream 38 and the Q-channel data stream 40 are offset in time from each other by ½ of the period of clock 30, both data bits, being synchronized to clock 30, cannot change simultaneously. Therefore, with offset digital data streams 38 and 40 applied to the QPSK modulator 14, the modulator output signal 50 can only change in 90° increments. Limiting the angle changes to ±90° for modulator output signal 50 prevents an abrupt change in amplitude of the modulator output signal 50 that could be required for it to make a 180° phase change. Therefore, the limited angle change facilitates a constant amplitude modulated signal. A commercially available modulator suitable for use in the present invention is a FD8-JDM-30, quadriphase modulator from Olektron Corp., Dudley Mass.

It should be noted that an unfiltered 4-state phase shift key modulated signal, as provided by the modulator output signal 50, produces a spectrum having a sin x/x envelope distribution. FIG. 4 illustrates the spectrum of an unfiltered modulator output of an operating prototype using pseudo random NRZ waveforms as inputs.

To provide spectral shaping, a tracking filter type phaselocked loop (PLL) 16 follows the QPSK modulator output signal 50. As shown in FIG. 1, the loop 16 comprises a phase detector 70, a filter network 72, a high gain d-c amplifier 82, a voltage controlled oscillator (VCO) 74, and a power splitter 76. The VCO 74 having an essentially constant amplitude, produces the VCO output signal 80, which is applied to the PLL output 78 through the power splitter 76. The power splitter 76 also feeds back signal 78 to the phase detector 70.

Figure 5A:
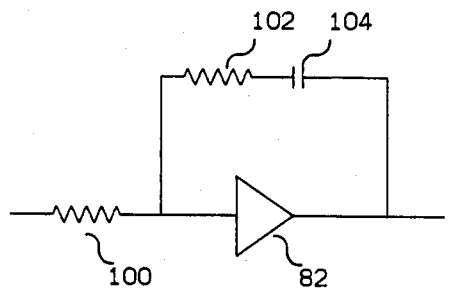

A widely used loop filter is a low pass filter. As shown in FIG. 5A, the low pass loop filter comprises amplifier 82, resistors 100 and 102, and capacitor 104. This filter results in a stable second order loop in which transient characteristics such as damping factor and natural frequency are satisfactory for tracking filter type loop operation.

Figure 6A:
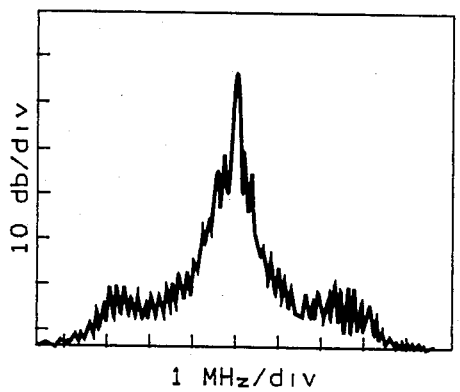

In an operating prototype of the present invention, a low pass loop filter produced a spectral response in the transmitted signal as shown in FIG. 6A. It is noted that the spectrum is reduced compared to the spectrum illustrated in FIG. 4. However, in order to meet certain spectral requirements for radio transmission, the cutoff frequency of the low pass loop filter had to be lowered to such an extent that the main lobe of transmitted power was affected. This resulted in intersymbol and interchannel interference.

Figure 5B:
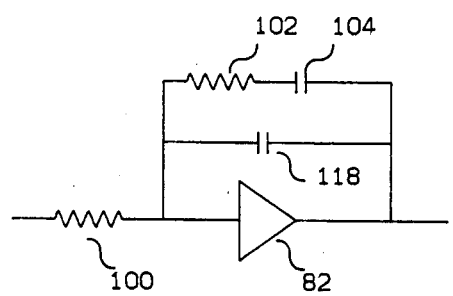
Figure 6B:
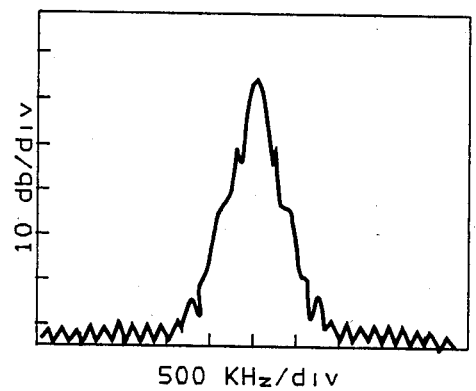

In order to alter the shape of the spectrum to achieve more roll off at high frequencies without altering the main lobe, a capacitor 118 was added to the low pass filter, as is shown in FIG. 5B. As shown in FIG. 6B, the spectrum produced using the filter circuit of FIG. 5B is reduced compared to the spectrum illustrated in FIG. 6A.

Figure 5C:
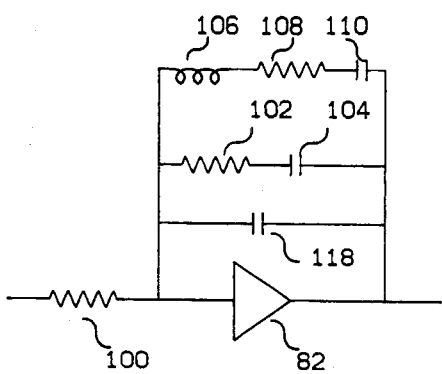
Figure 6C:
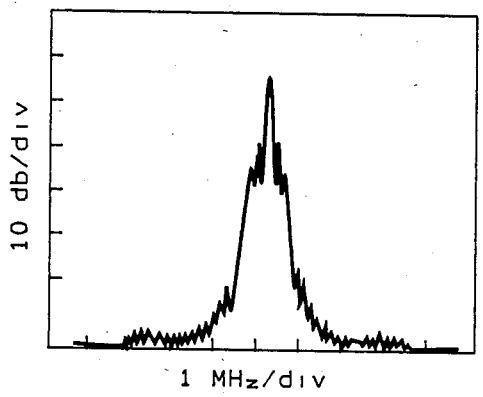

Further shaping of the spectrum of the transmitted signal without affecting the main lobe can be accomplished using the filter circuit of FIG. 5C in which a series L-R-C branch circuit is added to the filter in circuit 5B. This series branch circuit comprises inductor 106, resistor 108 and capacitor 110. This branch circuit eliminates a discrete frequency from the output of the phase locked loop, and further causes a notch centered about the resonant frequency of the L-R-C branch circuit. As shown in FIG. 6C, the spectrum produced using the filter circuit of FIG. 5C is reduced compared to the spectrum illustrated in FIG. 6B.

Figure 5D:
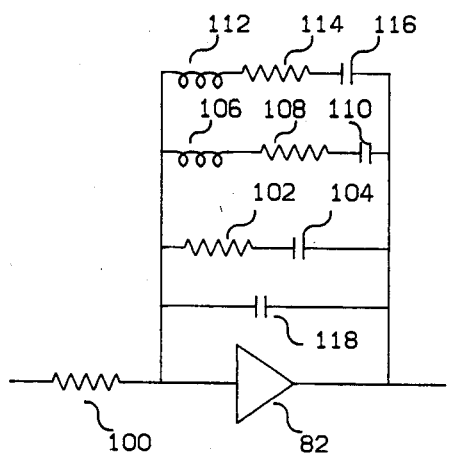
Figure 6D:
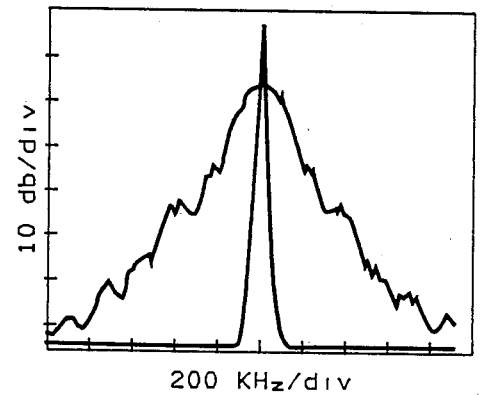

Additional shaping can be accomplished using the filter circuit of FIG. 5D in which a series L-R-C branch circuit comprising variable inductor 112, resistor 114 and capacitor 116 is added to the filter circuit shown in FIG. 5C. FIG. 6D illustrates a spectrum obtained in which L-112 was adjusted so that the first hump in spectrum is 20 db below the data lobe.

Referring again to FIG. 1, signal 78, the PLL output signal is an angle modulated carrier signal having a substantially constant amplitude and a spectrum distribution suitable for radio transmission. Signal 78 is applied to mixer 84 along with a signal from a local oscillator 86 which applies a carrier frequency signal to mixer 84. The modulated carrier is up converted in mixer 84 to carrier frequency and is applied to the input of high power amplifier 18.

The high power amplifier 18 provides power amplification to a level suitable for transmission, for example about 10 watts. In the system shown in FIG. 1, transmitter amplifier 18 can be a class C amplifier operated at power levels approaching its maximum power handling capacity.

A circuit which can be utilized to generate a constant amplitude QPSK modulated signal according to the present invention is illustrated in FIG. 7.

Sections of the circuit of FIG. 7 which correspond to block sections shown in FIG. 1 are identified by the same reference numeral.

The circuit is preferably implemented using a combination of integrated circuits, wideband transistors and radio frequency function modules. The function of each circuit, transistor or module is fully described by literature supplied by the manufacturers of these components, and the manner in which the circuit operates would be obvious to one skilled in the art of electronics.

Power supplies and other conventional circuitry such as the oscillator 44 required by the present invention have not been illustrated in FIG. 7 for the sake of simplicity. Again, such power supplies and additional circuitry are well known to those skilled in the art of electronics.

The invention has been illustrated and described in terms of a preferred embodiment as illustrated in FIGS. 1, 3 and 7. As has been previously discussed, reasonable variations and modifications are possible within the scope of the disclosure and the appended claims to the invention.

That which is claimed is:

1. Apparatus for generating a constant amplitude offset QPSK modulated signal and for controlling the occupied bandwidth of transmitted power in a radio frequency communication system for transmitting said offset QPSK modulated signal, said apparatus comprising:

an offset circuit for offsetting in time a first and a second binary data input, said offset circuit also having a clock input, and first and second binary data outputs;

means for providing a first serial binary data stream to said first binary data input of said offset circuit;

means for providing a second serial binary data stream to said second binary data input of said offset circuit;

means for providing a clock signal to said clock input of said offset circuit, wherein said first and second serial binary data streams as applied to said offset circuit are synchronized to each other and to said clock signal;

a QPSK modulator having first and second binary data inputs, and a carrier input;

means for providing a first serial binary data stream to said first binary data input of said QPSK modulator from said first binary data output of said offset circuit;

means for providing a second serial binary data stream to said second data input of said QPSK modulator from said second binary data output of said offset circuit, wherein said second serial binary data stream as applied to said QPSK modulator is displaced in time with respect to said first serial binary data stream as applied to said QPSK modulator by ½ of the period of said clock signal;

means for providing an intermediate frequency carrier wave to said carrier input of said QPSK modulator wherein said intermediate frequency carrier wave is modulated in response to said first and second binary data inputs of said QPSK modulator to provide a modulated intermediate frequency carrier signal;

a phaselocked loop tracking filter having a low pass loop filter and a constant amplitude voltage controlled oscillator and having an input and an output, wherein the output of said phaselocked loop is provided from said constant amplitude voltage controlled oscillator;

filter means, connected to said low pass loop filter, for eliminating predetermined frequency components from the output of said phaselocked loop, wherein said predetermined frequency components correspond to the frequency of spurious emissions generated by an offset QPSK modulated signal, and wherein said occupied bandwidth of transmitted power is controlled by said filter means connected to said low pass loop filter; and means for providing said modulated intermediate frequency carrier signal from the output of said QPSK modulator to the input of said phaselocked loop, wherein said constant amplitude offset QPSK modulated signal is provided from said output of said phaselocked loop.

2. Apparatus in accordance with claim 1 wherein said constant amplitude voltage controlled oscillator has a central frequency equal to the frequency of said intermediate frequency carrier signal of the QPSK modulator.

3. Apparatus in accordance with claim 1 wherein said low pass loop filter is an active filter comprising a high gain operational amplifier, an input resistor, and a first feedback branch for said operations amplifier comprising a series connected resistor and capacitor.

4. Apparatus in accordance with claim 3 wherein said filter means connected to said low pass loop filter comprises a second feedback branch for said operational amplifier comprising a capacitor.

5. Apparatus in accordance with claim 4 wherein said filter means connected to said low pass loop filter comprises a third feedback branch for said operational amplifier comprising a series connected resistor, capacitor and inductor.

6. Apparatus in accordance with claim 4 wherein said filter means connected to said low pass filter comprises a fourth feedback branch for said operational amplifier comprising a series connected resistor, capacitor, and a variable inductor.

7. A radio system for transmitting 4-state data signals comprising:
  a QPSK modulator having first and second binary data inputs, an intermediate frequency (IF) carrier input, and a modulated IF output, said modulated IF output containing 4-state phase modulation;
  means for providing a first binary data stream to said first binary data input, wherein said first binary data stream is clocked by a clock signal, and the transitions of said first binary data stream are synchronized to the rising edge of said clock signal;
  means for providing a second binary data stream to said second binary data input, wherein said second binary data stream is clocked by said clock signal and the transitions of said second binary data stream are synchronized to the falling edge of said clock signal;
  said first and second binary data streams having bits that taken together form said 4-state data signal, said 4-state phase modulation being responsive to said 4-state data signal;
  means for providing an IF carrier signal to said IF carrier input;
  a phaselocked loop tracking filter having a low pass loop filter, and a constant amplitude voltage controlled oscillator, and having an input and an output, wherein the output of the phaselocked loop is provided from said constant amplitude voltage controlled oscillator;
  means for providing said modulated IF output to the input of said phaselocked loop wherein a constant amplitude phase modulated signal is obtained from the output of said phaselocked loop;
  means for translating the frequency of said constant amplitude phase modulated signal from said IF carrier frequency to an RF carrier frequency signal, said means for translating frequency having an input and an output;
  means for providing said constant amplitude phase modulated signal, to the input of said means for translating frequency, whereby a RF signal having constant amplitude and 4-state phase modulation is provided at the output of said means for translating frequency.
  a power amplifier having an input and an output;
  means for pvoding the output of said means for translating frequency to the input of said power amplifier to provide an amplified RF carrier signal, wherein said power amplifier is operated at power levels approaching its maximum power handling capacity;
  an antenna; and
  means for providing said amplified RF carrier signal to said antenna.

8. A radio system in accordance with claim 7 wherein said power amplifier is operated as a class C amplifier.

9. A method for shaping the spectrum produced in transmitting digital data in a radio frequency communication system, said method comprising the steps of:
  (a) modulating a continuous carrier wave in an offset QPSK modulator wherein the modulation of said carrier wave is responsive to a pair of binary signals;
  (b) filtering said carrier wave, after said wave has been modulated, in a phase locked loop tracking filter having a low pass loop filter which includes a plurality of passive electrical elements;
  (c) transmitting said carrier wave after said carrier wave has been modulated and filtered; and
  (d) connecting an R-L-C series circuit branch in parallel relationship with at least one of said plurality of passive circuit elements prior to said filtering steps wherein the sectrum of radio frequency power transmitted by said radio frequency communication system is shaped by said R-L-C series circuit branch.

10. A method in accordance with claim 9 wherein said continuous carrier wave, which is modulated in paragraph (a), is an intermediate frequency carrier wave, and wherein said method additionally comprises the step of:
  converting said intermediate frequency carrier wave to a radio frequency carrier wave after said step for filtering in paragraph (b), and before said transmitting step in paragraph (c).

* * * * *